United States Patent [19]

Freeman

[11] 4,086,912

[45] May 2, 1978

[54] SOLAR COLLECTOR PANEL

[76] Inventor: John M. Freeman, 1106 N. Villa Dr., Evansville, Ind. 47711

[21] Appl. No.: 738,727

[22] Filed: Nov. 4, 1976

[51] Int. Cl.² .............................................. F24J 3/02
[52] U.S. Cl. .................................................. 126/271
[58] Field of Search ............... 126/270, 271; 237/1 A; 239/17, 193, 542

[56] References Cited

U.S. PATENT DOCUMENTS

| 1,101,001 | 6/1914 | Willsie | 126/271 |
| 1,119,063 | 12/1914 | Burnap | 126/271 |
| 2,005,377 | 6/1935 | Kasley | 126/271 |
| 3,399,664 | 9/1968 | Suhay | 126/271 |
| 3,561,425 | 2/1971 | Gardner | 126/271 |
| 3,918,430 | 11/1975 | Stout et al. | 126/271 |

Primary Examiner—Kenneth W. Sprague
Assistant Examiner—James C. Yeung
Attorney, Agent, or Firm—Warren D. Flackbert

[57] ABSTRACT

A solar collector panel characterized by an integral base having a heat transfer liquid channel and weir at each end of a corrugated heat transfer surface. The channel and weir define a self-contained heat transfer liquid system which provides for the even distribution and collection of such liquid over and from the heat transfer surface.

2 Claims, 8 Drawing Figures

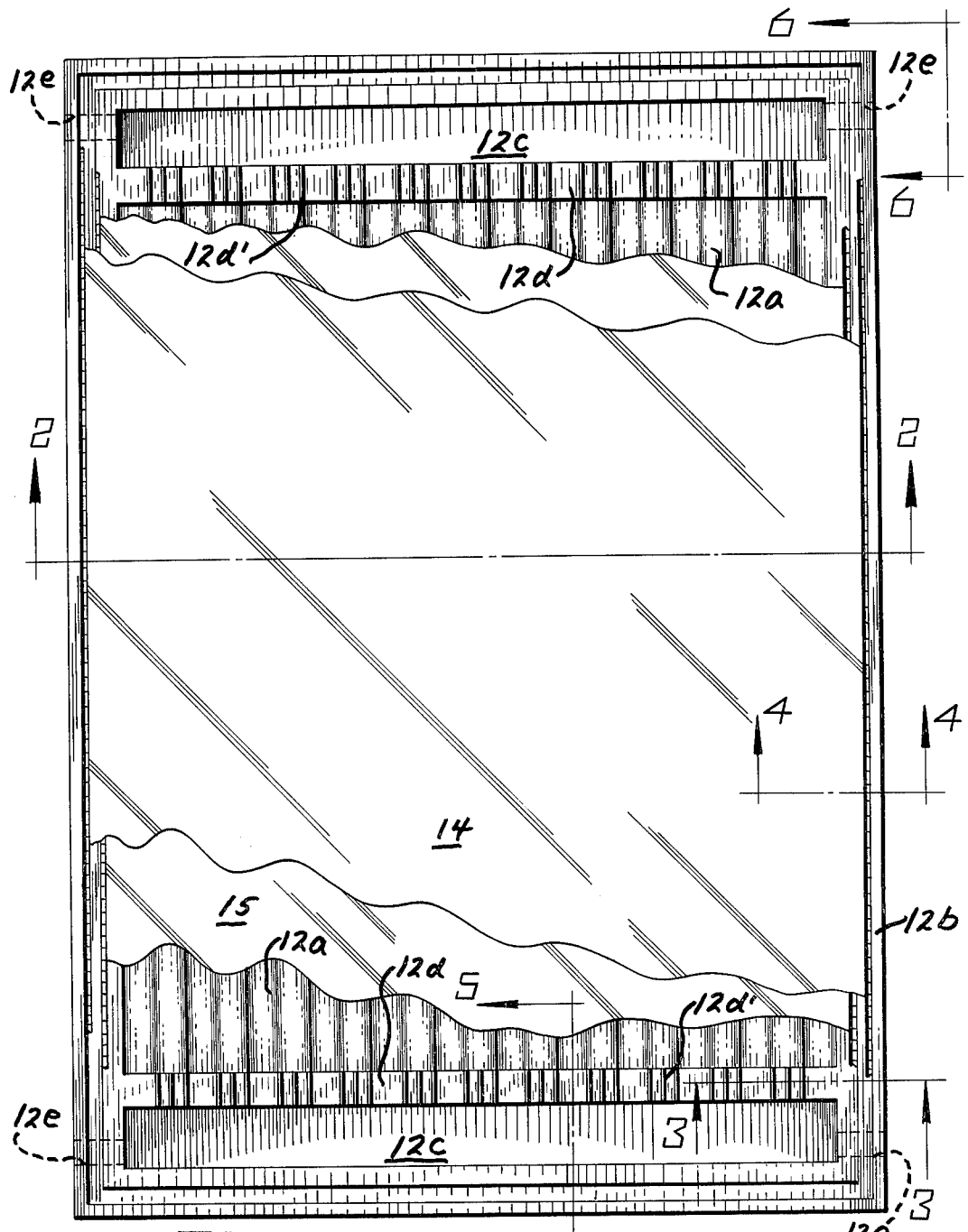
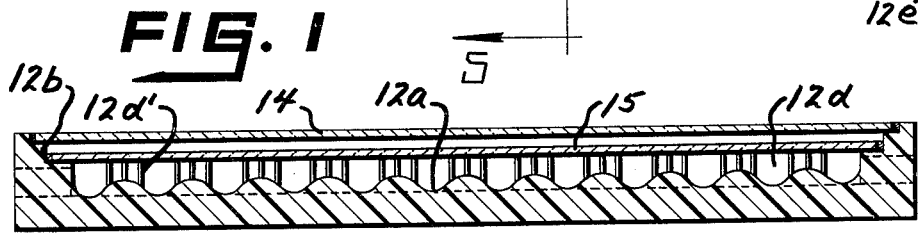

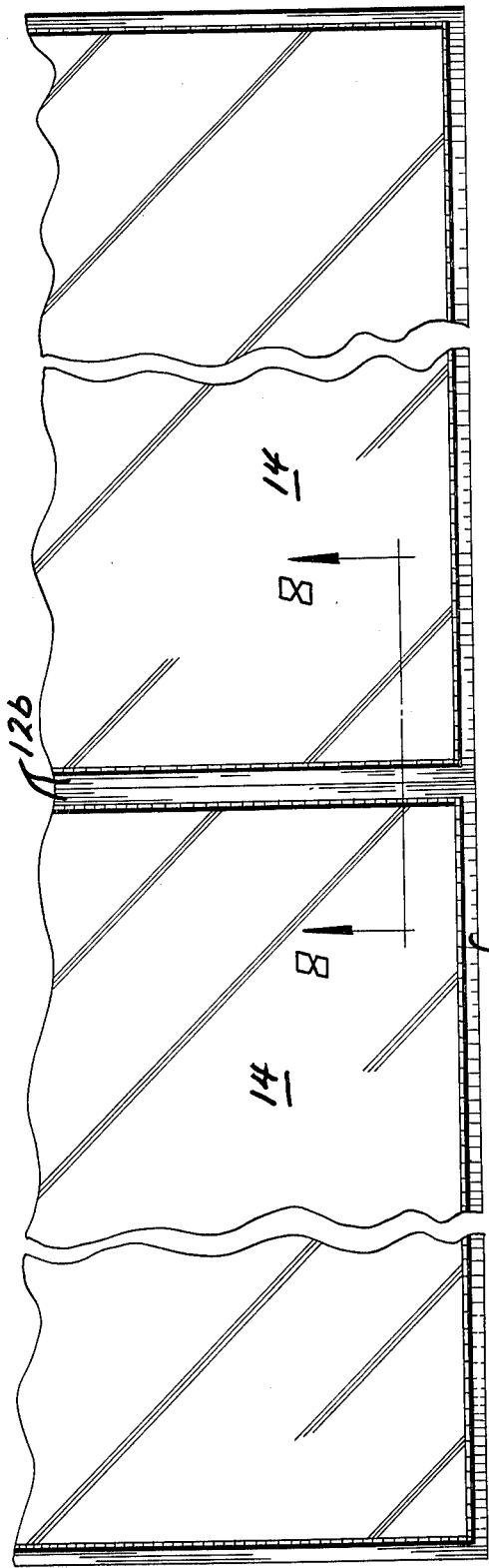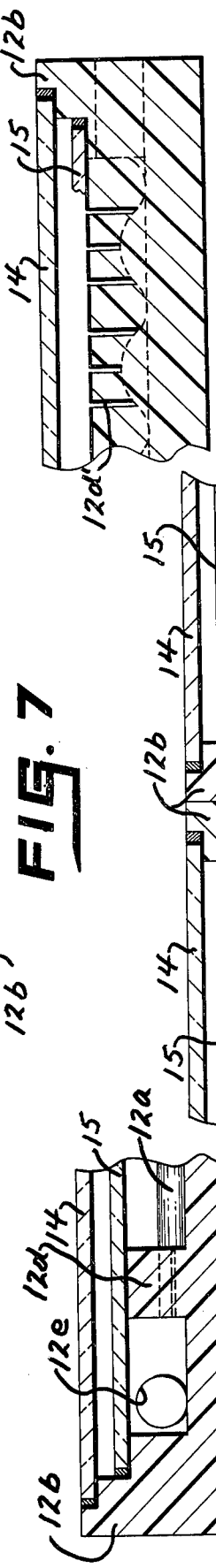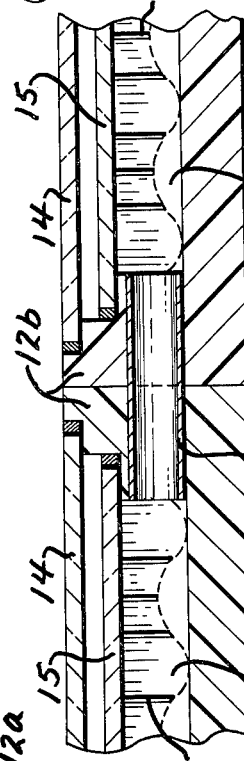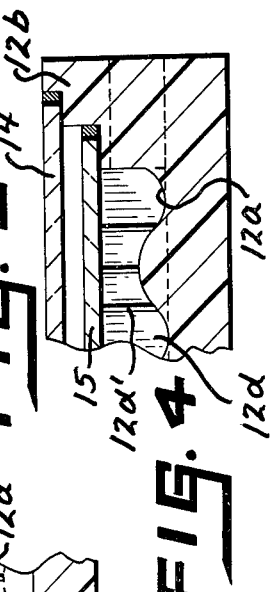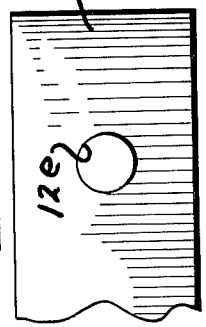

SOLAR COLLECTOR PANEL

The interest in systems for transferring solar energy, as for home heating, for example, is widespread. An important component of such a system is the solar collector panel, i.e. the unit in which solar energy is transferred to another medium, as water. The importance of a solar collector panel lies in attaining the maximum solar energy transfer, where such objective is further achieved by the proper physical placement of the unit.

The invention satisfies the preceding in affording a one-piece molded solar collector panel which, through a weir arrangement, evenly spreads heat transfer liquid for passage over a corrugated heat transfer surface. The weir forms part of a heat transfer liquid channel located at opposite ends of the solar collector panel, where the overall unit is covered by glazing material, as glass.

In other words, heat transfer liquid is introduced into the liquid channel at one end of the solar collector panel, thereafter passing through slots defined in the weir and onto the corrugated heat transfer surface. The liquid then passes from the heat transfer surface into the heat transfer liquid channel at the other end of the solar collector panel. The invention provides advantageous solar energy transfer not only on the heat transfer surface, but in the heat transfer liquid channels as well.

Other importance of the invention lies in the molding thereof, in one piece, from a plastic material, meaning ease in basic manufacturing and assembly, and a lightweight finished unit. As a matter of example, the base of the solar collector panel might be polyurethane foam.

A better understanding of the present invention will become apparent from the following description, taken in conjunction with the accompanying drawings, wherein FIG. 1 is a top plan view, partly fragmentary, showing a solar collector panel in accordance with the teachings of the invention;

FIG. 2 is a view in cross-section, taken at line 2—2 on FIG. 1 and looking in the direction of the arrows, further showing the invention;

FIG. 3 is another view in cross-section showing details of the invention, taken at line 3—3 on FIG. 1 and looking in the direction of the arrows;

FIG. 4 is a further view in cross-section showing details of the invention, taken at line 4—4 on FIG. 1 and looking in the direction of the arrows;

FIG. 5 is still a further view in cross-section showing details of the invention, taken at line 5—5 on FIG. 1 and looking in the direction of the arrows;

FIG. 6 is a view in side elevation, taken at line 6—6 on FIG. 1 and looking in the direction of the arrows;

FIG. 7 is a fragmentary top plan view showing two side-by-side solar collector panels; and, FIG. 8 is a view in cross-section, taken at line 8—8 on FIG. 7 and looking in the direction of the arrows, showing details of the assembly of the solar collector panels.

For the purposes of promoting an understanding of the principles of the invention, reference will now be made of the embodiment illustrated in the drawings and specific language will be used to describe the same. It will nevertheless be understood that no limitation of the scope of the invention is thereby intended, such alterations and further modifications of the illustrated device and such further applications of the principles of the invention as illustrated therein being contemplated as would normally occur to one skilled in the art to which the invention relates.

Referring now particularly to FIGS. 1 to 6, inclusive, the solar collector panel of the invention is defined by a base 12, typically formed from foamed polyurethane plastic. The base 12 is defined by a bottom heat transfer surface 12a in the form of convolute curves (see FIG. 2, for example). Edges 12b of the base 12 are stepped to receive glazing material, such as spaced-apart glass plates 14 and 15. As to be understood herebelow, the spacing between plates 14 and 15 defines an insulative air space which minimizes heat loss from the heat transfer liquid.

Heat transfer liquid channels 12c are formed at opposite ends of the base 12, where such are each defined, in addition to the base 12, by glass plate 15 and by a weir 12d. Thus, the channels 12c are a molded part of the base 12, eliminating the need for independent distribution and collecting arrangements. Openings 12e are provided to permit the passage of heat transfer liquid to and from the channels 12c.

As to weir 12d, each includes a series of slots 12d' therein which serve to distribute and spread, and to collect, heat transfer liquid from and to the channels 12c. In other words, the heat transfer liquid in the channel 12c at one end of the unit is distributed and spreads through the slots 12d' of the weir 12d and onto the heat transfer surface 12a. Thereafter, the liquid is collected at the channel 12c at the opposite end of the unit, after passing through weir 12d, and transmitted to a heat storage unit (not shown).

It should be evident, as from FIG. 1, that the distribution and collection areas for the heat transfer, in channels 12c, are exposed to solar rays, thereby adding overall efficiency to the solar collector panel. The preceding is in contrast to earlier structures where collection and distribution of heat transfer liquid was accomplished by means of solid-walled conduits or the like.

FIGS. 7 and 8 disclose two side-by-side solar collector panels, where FIG. 8 illustrates the use of a bonded connector conduit 12f, such being employed (but not shown) both at the input and output for the heat transfer fluid. Again, the importance of the arrangement of FIGS. 7 and 8 lies in the presented module and in the elimination of any visible connectors for the passage of heat transfer liquid between adjacent solar collector panels.

As known, the typical use of a solar collector panel is at an inclined angle, and, in this connection, the invention affords versatility in the use of a particular panel in that either end can either serve distributing or collecting purposes, depending upon installation.

From the preceding, it should be evident that the invention provides a solar collector panel which is readily manufactured, light in weight, and easily placed in a system. The invention permits added exposure to solar energy, and, hence, a higher rate of efficiency than units previously in use. Moreover, the invention permits the ganging of panels without the need of external visible connectors.

The solar collector described above is susceptible to various changes within the spirit of the invention. In this connection, proportioning may be varied, the number of slots in each weir modified, the corrugated configuration of the heat transfer surface modified, and the like. Thus, the preceding should be considered illustrative and not as limiting the scope of the following claims:

I claim:

1. A solar collector panel comprising, in a one-piece molded relationship, a base having a corrugated heat transfer surface, a first channel disposed at one end of said heat transfer surface for receiving a heat transfer liquid, a first weir forming a wall of said first channel adjacent to said heat transfer surface, a second channel disposed at an opposite end of said corrugated heat transfer surface, and a second weir forming a wall of said second channel adjacent to said heat transfer surface, where said first and second weirs include slots extending downwardly to said heat transfer surface, and where said first and second channels, said first and second weirs and said corrugated heat transfer surface of the solar collecting panel are covered by glazing material exposed to solar energy.

2. The solar collector panel of claim 1 where said first channel communicates with a source of heat transfer liquid, and where said second channel empties into a heat storage device.

* * * * *